H. D. FOWLER.
VARIABLE AREA WING.
APPLICATION FILED SEPT. 22, 1920.
1,392,005.
Patented Sept. 27, 1921.
4 SHEETS—SHEET 1.
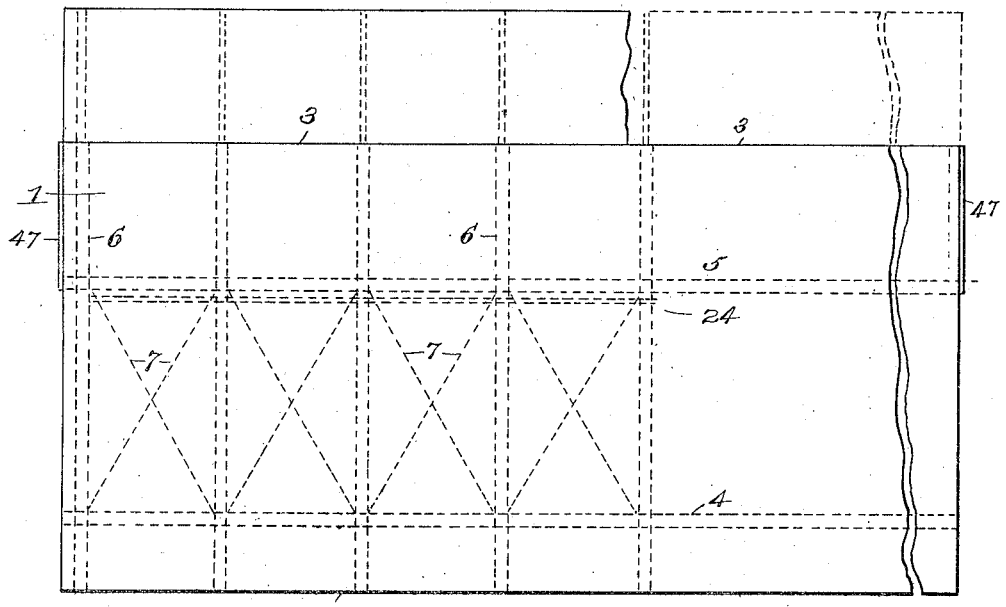
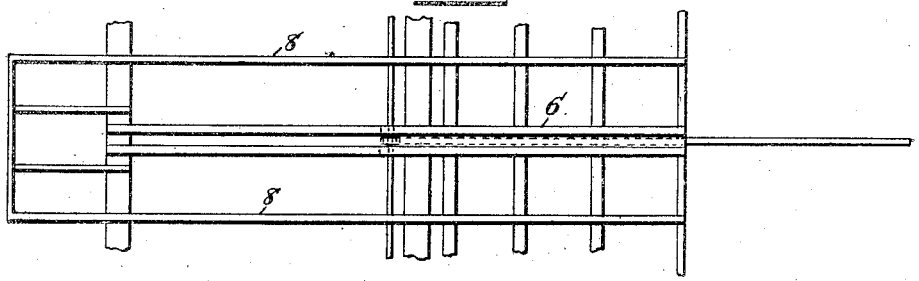
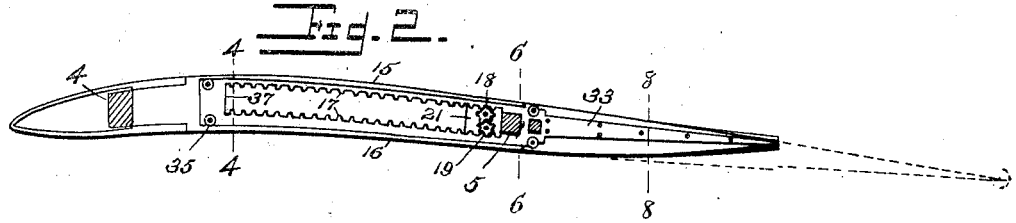
Inventor
Harlan Davey Fowler H. D. FOWLER.
VARIABLE AREA WING.
APPLICATION FILED SEPT. 22, 1920.
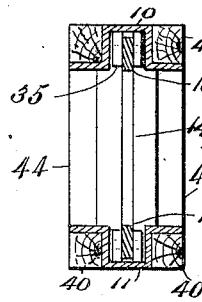
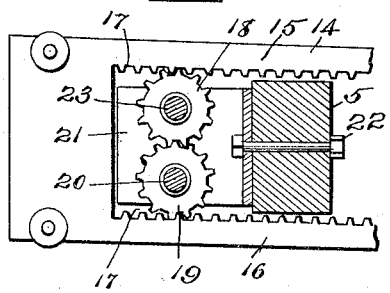
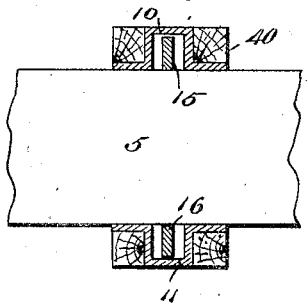
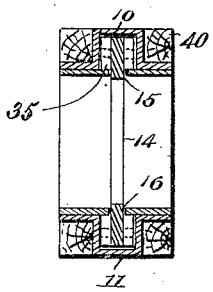
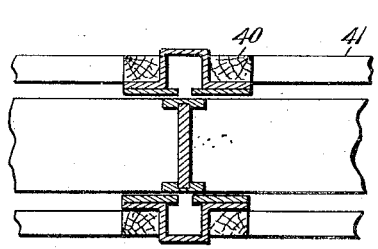
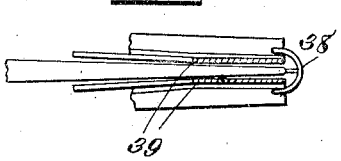
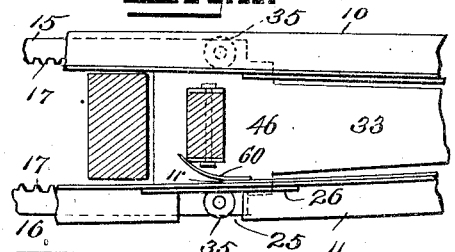
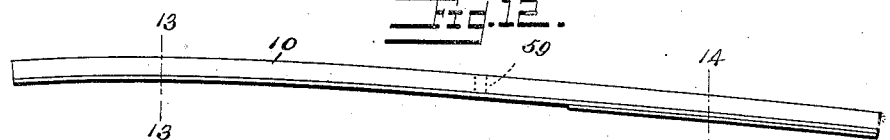
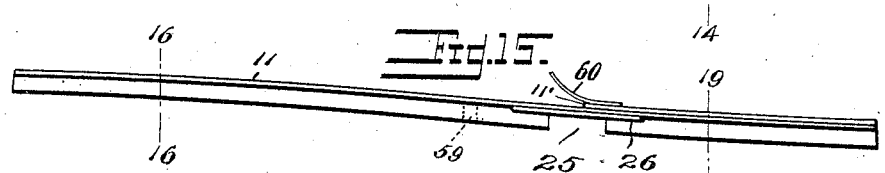
Inventor
Harlan Darcy Fowler

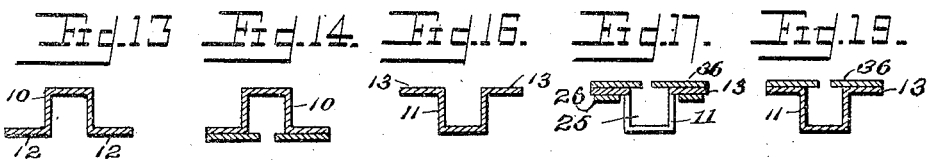
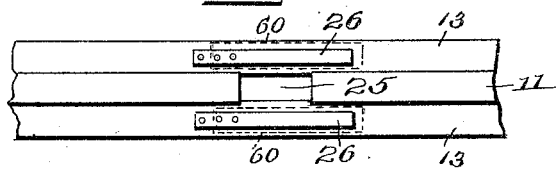
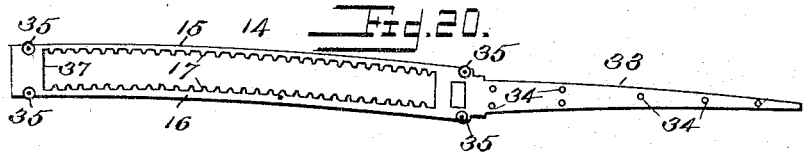
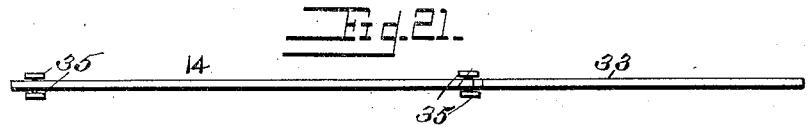
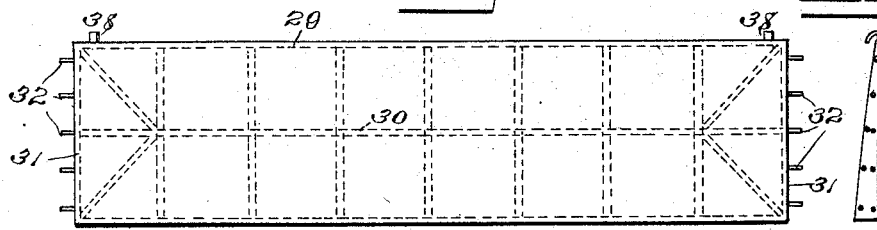
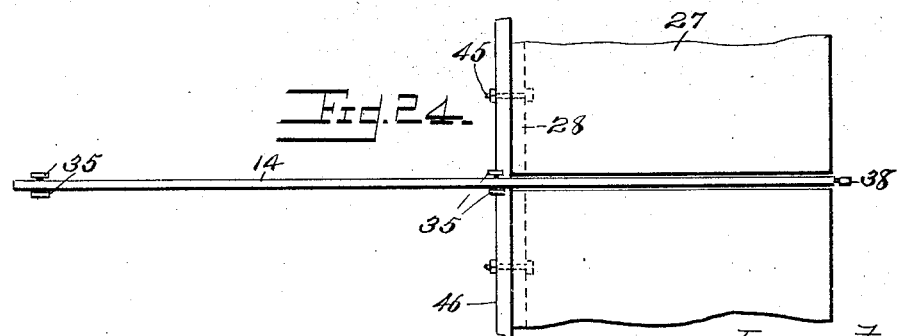

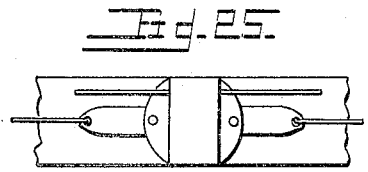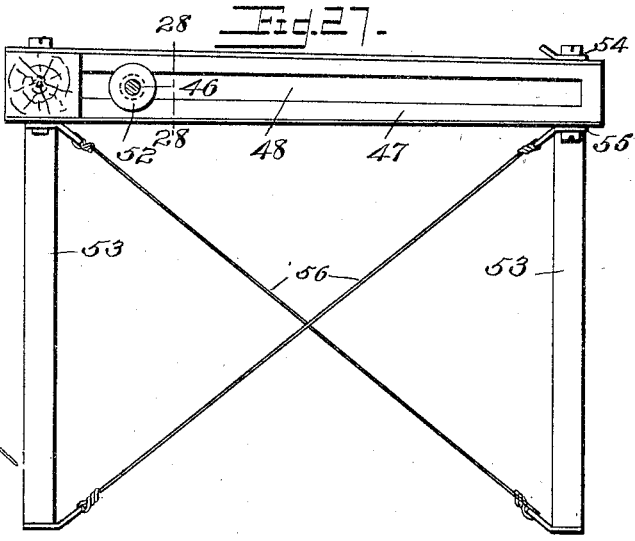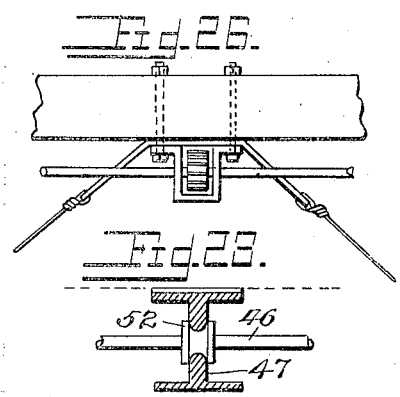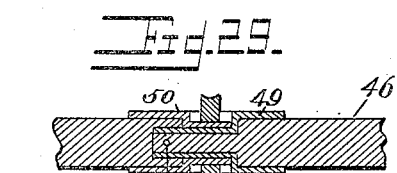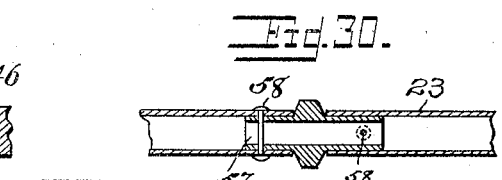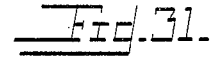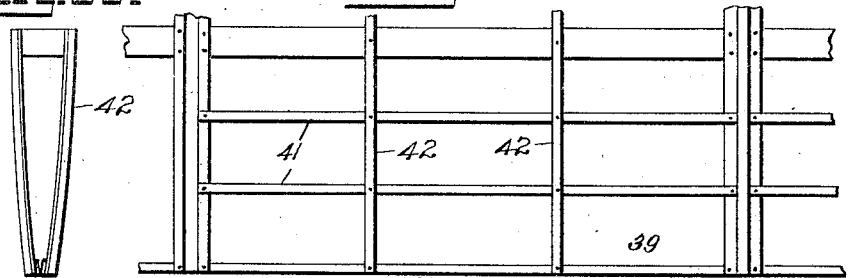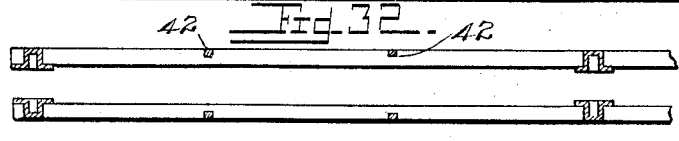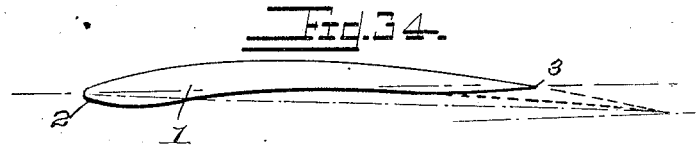

UNITED STATES PATENT OFFICE.

HARLAN DAVEY FOWLER, OF SACRAMENTO, CALIFORNIA.

VARIABLE-AREA WING.

1,392,005.     Specification of Letters Patent.     Patented Sept. 27, 1921.

Application filed September 22, 1920. Serial No. 411,936.

*To all whom it may concern:*

Be it known that I, HARLAN DAVEY FOWLER, a citizen of the United States, residing at Sacramento, in the county of Sacramento and State of California, have invented certain new and useful Improvements in Variable-Area Wings, of which the following is a specification.

My invention relates to aircraft and especially to the type of aircraft embodying one or more aerofoils or aerial supporting and lifting planes or wings having upper and lower surfaces which are usually cambered or curved to give the required lift, the latter ordinarily depending on the speed of the craft, power of the motor or other conditions.

The object of my invention is to provide in conjunction with such aerofoil, novel and efficient means under the control of the operator, for varying the area, chord, camber and angle of incidence thereof and incidentally controlling the aspect ratio and movement of the center of pressure. The arrangement enables the speed of the craft to be changed and regulated at the will of the aviator and thereby provides for a low and safe landing and launching speed. It also provides for increasing the lift of the craft for heavier loads and in general increases the efficiency, economy of operation and safe and effective handling of the craft.

Furthermore and incidental to the structural features herein described and shown, an aerofoil of any approved cross section, chord, camber or curvature may be adopted, the general character of the curvature being maintained irrespective of the variation in the supporting or lifting area of the aerofoil as a whole.

As the craft rises in free flight, the controlling mechanism is brought into operation and the area of the aerofoil decreased with the attending change in camber and angle of incidence, reducing the head resistance and thereby increasing speed of the craft until the minimum area of the aerofoil is obtained and the machine develops its maximum speed. In landing the operation just referred to is reversed until the minimum flying speed is obtained.

In the accompanying drawings:

Figure 1 is a plan view of an aerofoil embodying my invention;

Fig. 2 is a vertical cross section through the same;

Fig. 3 is a plan view of the parts shown in Fig. 2;

Fig. 4 is a cross section through one of the compression ribs on line 4—4 of Fig. 2;

Fig. 5 is a fragmentary vertical longitudinal section of the same line as Fig. 2 and on an enlarged scale showing the rack and pinion mechanism for varying the area of the aerofoil;

Fig. 6 is a cross section on line 6—6 of Fig. 2;

Fig. 7 is a cross section through the rear portion of the compression rib showing means for controlling the flexible area of the aerofoil;

Fig. 8 is a cross section on the line 8—8 of Fig. 2;

Fig. 9 is a fragmentary vertical longitudinal section through the trailing edge portion of the aerofoil;

Fig. 10 is a similar view taken at a different point showing the relation of the upper and lower channel members of the compression rib to the covering fabric of the aerofoil;

Fig. 11 is an enlarged vertical longitudinal section through a portion of one of the compression ribs showing means for permitting flexure of the lower channel member;

Fig. 12 is a side view of the upper channel member of one of the compression ribs;

Fig. 13 is a cross section on the line 13—13 of Fig. 12;

Fig. 14 is a cross section on line 14—14 of Fig. 12;

Fig. 15 is a side view of the lower channel member of one of the compression ribs;

Fig. 16 is a cross section on line 16—16 of Fig. 15;

Fig. 17 is a cross section through the same taken in line with the flexible portion of the lower channel member;

Fig. 18 is a bottom plan view of the structure shown in Fig. 15;

Fig. 19 is a cross section on line 19—19 of Fig. 15;

Fig. 20 is a side elevation of one of the pull and thrust members controlling change in area of the aerofoil;

Fig. 21 is a plan view of the same;

Fig. 22 is a plan view of the trailing extension detached;

Fig. 23 is an end view of the same;

Fig. 24 is a fragmentary plan view of the trailing extension and one of the pull and thrust members on an enlarged scale;

Fig. 25 is a fragmentary view in elevation of one of the aerofoil spars showing connection therewith of the drift braces or stays;

Fig. 26 is a view taken at a right angle of Fig. 21;

Fig. 27 is a side elevation of one of the end spar assemblies;

Fig. 28 is a cross section on line 28—28 of Fig. 27;

Fig. 29 is a fragmentary longitudinal sectional view showing the coupling between adjoining sections of the floating spar.

Fig. 30 is a fragmentary longitudinal section through the controlling shaft showing the universal joint therein;

Fig. 31 is a fragmentary plan view of the trailing portion of the aerofoil in which the trailing extension is housed;

Fig. 32 is a vertical section through the same perpendicular to the normal line of flight;

Fig. 33 is a section through the same taken at a right angle to Fig. 32; and

Fig. 34 is an end view of the aerofoil showing the minimum area thereof in full lines and the maximum area thereof by dotted lines.

In carrying out the present invention, owing to the structural features hereinafter fully described and shown in the drawings, a "wing section" of any desired form or curvature may be employed; that is to say, an aerofoil, plane, or wing such as is used in conjunction with an aeroplane or aircraft of any kind, having any desired chord, camber, area and aspect ratio may be adopted, in accordance with the required speed and lift or load carrying capacity of the craft in connection with which the improvement is utilized.

In Fig. 1 I have shown an aerofoil 1 the leading edge of which is indicated at 2 and the normal trailing edge of which is indicated at 3, 4 designating leading spar and 5 the trailing spar. The aerofoil comprises main compression ribs 6 between which extend the drift braces or stays 7 usually consisting of wires or cables and also comprises the ordinary or inferior ribs 8, all of the ribs being suitably capped as shown to properly support the covering or fabric indicated at 9. The full lines in Fig. 1 indicate the minimum area of the aerofoil while certain dotted lines therein illustrate the maximum area of the aerofoil when the trailing extension is projected to its limit through and beyond the trailing edge 3.

Each of the compression ribs 6 as shown ing Fig. 2 et seq., embodies in its construction the upper channel member 10 (see Fig. 12) and also the lower channel member 11 (see Fig. 15), the members 10 and 11 being curved in the direction of their length in accordance with the upper and lower camber or curvature of the rib and the supporting surface of the aerofoil as a whole, said channel members serving to impart the required cross section to the aerofoil. The upper channel member 10 is U-shaped in the cross section with flanges 12 at the bottom thereof. The lower channel member 11 is also U-shaped with flanges 13 at the top thereof. The channel members 10 and 11 are thus reversely disposed in relation to each other to form top and bottom guides for a slidable pull and thrust member 14 shown in side elevation in Fig. 20 and in plan view in Fig. 21.

The pull and thrust member 14 to which the trailing extension, hereinafter particularly described, is attached is curved lengthwise to correspond with the curvature of the compression rib; said member 14 embodies top and bottom portions 15 and 16 with opposed rack teeth 17 that mesh with pinions 18 and 19 (see Figs. 2 and 5), said pinions being located one above the other and meshing together so that they rotate simultaneously in opposite directions and serve to exert a pull or thrust on the member 14 according to their direction of rotation. The lower pinion 19 is mounted on a short stub shaft 20 journaled in a bearing 21 secured by fastening means 22 such as a bolt to the trailing spar 5. The upper pinion 18 is fastened to a controlling or operating shaft 23 which extends parallel to the trailing spar 5 and is operated by any suitable means including a wheel or gear 24 (see Fig. 1), the same being operable at the will of the aviator for the purpose of varying the area of the aerofoil.

The upper channel member 10 is, in the preferred embodiment of this invention, quasi rigid or inflexible so as to maintain the general curvature and upper camber of the aerofoil. The lower channel member 11 has a rear portion 11' which is flexibly connected to the forward portion thereof by cutting away a portion of said member as indicated at 25 (see Figs. 15 and 18) and applying to said member 11 one or more springs 26 which bridge the cut-away portion of member 11 and exert pressure against the rear section 11' to force the same toward the upper channel member; attached to the inner face of portion 11' at the point where the springs are placed are cams 60. The function of these cams is to give a positive upward movement of the lower flexible portion, and is accomplished when the extension 33 (see Fig. 11) is withdrawn to a point where the false spar 46 comes in contact with the upward curved cams, and as the extension is withdrawn still further the cam is forcibly pressed down and causes a pivotal flexible movement about the contact point of the springs 26 pressing against the flanges, the result being that the rear flexible area of the lower surface of the aerofoil is maintained in contact with the trailing extension hereinafter described. Thus a snug fitting overlapping relation is maintained between the top and bottom surfaces of the aerofoil and the trailing extension, as the latter is projected and retracted.

The trailing extension designated generally at 27 and shown in several of the figures including particularly Figs. 23 and 24 is made up of a leading spar 28, and a trailing spar 29 and in addition thereto may have an intermediate spar 30, said trailing extension being provided by a suitable covering fabric at the top and bottom and the end ribs 31 thereof being secured by bolts or other fasteners 32 to curved and rearwardly projecting extensions 33 of the pull and thrust members 14 hereinbefore described. Such extensions 33, shown in Fig. 20, is provided with holes 34 to receive fastening members 32. Each of the members 14 carries at opposite sides thereof pairs of disk shaped rollers 35 which, as shown in Fig. 7, roll within the upper and lower channel members 10 and 11 so as to enable the respective member 14 to slide freely in a fore and aft direction. Along the rear portions and inner adjacent faces of the channel members 10 and 11 there are secured flanges 36 under which the rollers 35 operate for the purpose of enabling the rear portion of the channel member 11 to be drawn upwardly toward the corresponding rear portion of the upper channel member 10, said rollers 35 also acting to press the rear portion 11' of the lower channel member away from the corresponding rear portion of the upper channel member 10 during the outward thrusting movement of the member 14. The outward movement of the trailing extension 27 is limited by a stop surface 37 on each member 14 coming in contact with the bearing 21 hereinbefore referred to. To insure a direct course of the teeth 17 passing over the gears 18 and 19 small strips 59 are fastened to the inner sides of the U-shaped channel members 10 and 11 (see Figs. 6 and 11) at a point slightly forward of the gear housing. The forward rollers 35 stop slightly ahead of these strips when the extension is fully extended.

The trailing extension 27 has at intervals along the trailing edge thereof, latch fingers or clamps 38 which as the trailing extension 27 reaches the forward limit of its movement engage over the extremities of the channel members 10 and 11 and pinch the same together, holding such rear extremities in fixed relation to each other while the trailing extension 27 is housed between the rear trailing portions of the upper and lower surface of the aerofoil. It will now be understood that as the trailing extension is moved rearwardly or forwardly, a positive connection is maintained between the trailing extension and the upper and lower surface of the aerofoil, by means of the connection between such trailing extension and the upper and lower channel members 10 and 11 of the compression rib. This insures a close overlapping contactual relation between the top and bottom surfaces of the aerofoil and the corresponding surfaces of the trailing extension, under any and all adjustments of the latter. Fig. 10 illustrates the manner in which the upper and lower channel members 10 and 11 gradually project beyond the covering fabric 9 so as to provide for a comparatively thin trailing edge for the aerofoil as a whole. Metal strips 39 extend lengthwise of the trailing edges of the upper and lower surfaces of the main body of the aerofoil to be engaged by the several clamping fingers 38 as shown in the detail sectional view Fig. 9. Filler pieces 40 are secured along opposite sides of the upper and lower channel members 10 and 11 as shown for example in Figs. 6, 7 and 8, and lateral tie strips 41 are supported by and fastened to the filler pieces 40, the strips 41 in turn supporting the usual cap strips 42 that support the covering fabric of the aerofoil.

It is preferred to house in the pull and thrust members 14 by securing webs 44 to the upper and lower channel members 10 and 11 as shown in Fig. 4. The leading spar 28 of the trailing extension 27 is secured by fasteners 45 to a floating spar 46, best shown in Fig. 24 and said floating spar is mounted for fore and aft movement in end supports 47 having longitudinal (usually curved) guideways 48 as shown in Fig. 27. Where spar 46 passes through each guideway 48, it is preferably cut in two and the ends are coupled together by means of a fitting comprising a male member 49 and a corresponding female member 50, as shown in Fig. 29, such members being secured together by the key or bolt 51. An anti-friction flanged or grooved roller 52 is journaled upon said coupling or fitting and travels back and forth in the guideway 48 as the spar 46 is traveling in a corresponding direction during the projecting and retracting movement of the trailing extension. Each of the end supports 47 is shown as secured to the ends of the adjacent struts 53 of a biplane or multiplane structure by means of upper and lower fittings 54 and 55 suitably formed to provide for the attachment thereto of the usual stays 56.

Fig. 30 illustrates a universal joint which may be placed at any suitable point or points in the shaft 23 hereinbefore referred to, said joint consisting of the double ended plug 57 inserted into the adjacent ends of the sections of said shaft 23 and held in relation thereto by pins or bolts 58.

From the foregoing description taken in connection with the accompanying drawings it will be understood that the aviator by turning the wheel 24 and thereby the shaft 23 may thrust the members 14 rearwardly or pull the same forwardly thereby projecting or retracting the trailing extension in relation to the trailing edge of the main body of the aerofoil. As a result of this, the area of the aerofoil is changed and incidentally a change is also brought about in the chord, the camber, angle of incidence and aspect ratio of the aerofoil. In starting a flight, the aviator may expose as much of the area of the trailing extension as he thinks advisable or necessary, according to the load or according to the dimensions of the field or body of water on which he has to alight. After the machine is in free flight the aviator may reduce the area of the supporting surface of the machine hereinbefore described, thereby reducing the head resistance and correspondingly increasing the speed of the ship. When he desires to land he can reduce the speed of the machine by increasing the area of the supporting surface thus enabling him to land at a comparatively slow speed and in safety to the machine and all of its occupants. The device is particularly valuable for landing and launching aircraft in circumscribed space. Another valuable feature of the invention resides in the adaptation of the structural features to a "wing section" of any desired curvature.

What I claim is:

1. In aircraft, a cambered aerofoil having upper and lower surfaces, one of which is flexible, and a trailing extension adapted to be housed within the body of the aerofoil and to be projected through the trailing edge thereof while maintaining the streamline of said cambered surface.

2. In aircraft, an aerofoil having upper and lower surfaces, one of which is cambered, and one of which is flexible, and a trailing extension adapted to be housed within the body of the aerofoil and to be projected through the trailing edge thereof while maintaining the streamline of said cambered surface.

3. In aircraft, a cambered aerofoil having upper and lower surfaces, one of which is flexible, and a trailing extension having a similarly curved surface and normally housed between said upper and lower surfaces and adapted to be projected through the trailing edge of the aerofoil while maintaining the curvature and extending the area of the curved surface of the aerofoil.

4. In aircraft, an aerofoil having upper and lower curved surfaces and a flexible trailing portion, and a trailing extension inclosed by the trailing portion of said aerofoil which is adapted to permit said extension to be projected from between said upper and lower surfaces to increase the effective lifting area of the aerofoil while maintaining the curvature thereof.

5. In aircraft, an aerofoil having upper and lower surfaces and including a flexible trailing portion, and a trailing extension inclosed by said trailing portion and adapted to be projected therethrough to increase the lifting area of the aerofoil, the trailing portion of one of said upper and lower surfaces being movable toward and away from the other to maintain contactual relations with said upper and lower surfaces as the trailing extension is projected and retracted.

6. In aircraft, an aerofoil having upper and lower surfaces and including a flexible trailing portion, and a trailing extension inclosed by said trailing portion and adapted to be projected therethrough to increase the lifting area of the aerofoil, the trailing portion of one of said upper and lower surfaces being movable toward and away from the other to maintain contactual relations with said upper and lower surfaces as the trailing extension is projected and retracted, and yieldable means for pressing such movable trailing portion of the aerofoil toward the opposite trailing portion.

7. In aircraft, an aerofoil having upper and lower surfaces and including a flexible trailing portion, and a trailing extension inclosed by said trailing portion and adapted to be projected therethrough to increase the lifting area of the aerofoil, the trailing portion of one of said upper and lower surfaces being movable toward and away from the other to maintain contactual relations with said upper and lower surfaces as the trailing extension is projected and retracted, and means for pressing the trailing edges of said upper and lower surfaces toward each other as the trailing extension is retracted.

8. In aircraft, an aerofoil having upper and lower surfaces and including a flexible trailing portion, and a trailing extension inclosed by said trailing portion and adapted to be projected therethrough to increase the lifting area of the aerofoil, the trailing portion of one of said upper and lower surfaces being movable toward and away from the other to maintain contactual relations with said upper and lower surfaces as the trailing extension is projected and retracted, and positive means for forcibly drawing the trailing portions of said upper and lower surfaces one toward the other as the trailing extension is retracted.

9. In aircraft, an aerofoil having upper and lower surfaces and including a flexible trailing portion, and a trailing extension inclosed by said trailing portion and adapted to be projected therethrough to increase the lifting area of the aerofoil, the trailing portion of one of said upper and lower surfaces being movable toward and away from the other to maintain contactual relations with said upper and lower surfaces as the trailing extension is projected and retracted, and means acting positively to deflect said movable trailing portion outwardly and inwardly as the trailing extension is projected and retracted.

10. In aircraft, an aerofoil having upper and lower surfaces and including a flexible trailing portion, and a trailing extension inclosed by said trailing portion and adapted to be projected therethrough to increase the lifting area of the aerofoil, the trailing portion of one of said upper and lower surfaces being movable toward and away from the other to maintain contactual relations with said upper and lower surfaces as the trailing extension is projected and retracted, and rollers carried by the trailing extension and operating with a positive action on said upper and lower surfaces to increase and decrease the distance between the same as the trailing extension is projected and retracted.

11. In aircraft, an aerofoil having upper and lower surfaces and including a flexible trailing portion, and a trailing extension inclosed by said trailing portion and adapted to be projected therethrough to increase the lifting area of the aerofoil, the trailing portion of one of said upper and lower surfaces being movable toward and away from the other to maintain contactual relations with said upper and lower surfaces as the trailing extension is projected and retracted, and means for latching the trailing edges of said upper and lower surfaces in fixed relation to each other when the trailing extension is retracted.

12. In aircraft, an aerofoil having upper and lower surfaces and including a flexible trailing portion, and a trailing extension inclosed by said trailing portion, and adapted to be projected therethrough to increase the lifting area of the aerofoil, the trailing portion of one of said upper and lower surfaces being movable toward and away from the other to maintain contactual relations with said upper and lower surfaces as the trailing extension is projected and retracted, means acting positively to deflect said movable trailing portion outwardly and inwardly as the trailing extension is projected and retracted, said means embodying a plurality of compression ribs, pull and thrust members guided and supported by said ribs and having said traveling extension attached thereto, and actuating means for said pull and thrust members.

13. In aircraft, an aerofoil having upper and lower surfaces and including a flexible trailing portion, and a trailing extension inclosed by said trailing portion, and adapted to be projected therethrough to increase the lifting area of the aerofoil, the trailing portion of one of said upper and lower surfaces being movable toward and away from the other to maintain contactual relations with said upper and lower surfaces as the trailing extension is projected and retracted, means acting positively to deflect said movable trailing portion outwardly and inwardly as the trailing extension is projected and retracted, said means embodying a plurality of compression ribs, pull and thrust members guided and supported by said ribs and having said trailing extension attached thereto, track flanges on said upper and lower surfaces, rollers carried by said pull and thrust members and engaging said flanges, and actuating means for said pull and thrust members.

14. In aircraft, an aerofoil having upper and lower surfaces and including a flexible trailing portion, and a trailing extension inclosed by said trailing portion, and adapted to be projected therethrough to increase the lifting area of the aerofoil, the trailing portion of one of said upper and lower surfaces being movable toward and away from the other to maintain contactual relations with said upper and lower surfaces as the trailing extension is projected and retracted, said means embodying a plurality of compression ribs each having upper and lower channel members and track flanges, pull and thrust members guided and supported by said channel members and having the said trailing extension attached thereto, and means for actuating said pull and thrust members.

15. An aerofoil having upper and lower lifting surfaces one of which embodies a flexible trailing area, and a trailing extension housed between said surfaces and adapted to be projected and retracted in relation to the trailing edge of the aerofoil, said trailing extension having a translational connection with said trailing area.

16. An aerofoil having upper and lower lifting surfaces one of which embodies a flexible trailing area and a trailing extension housed between said surfaces and adapted to be projected and retracted in relation to the trailing edge of the aerofoil, said trailing extension having a translational connection with said trailing area, whereby contactual and streamline relations between said surfaces and trailing extension are maintained as the latter is projected and retracted.

17. An aerofoil having upper and lower lifting surfaces one of which embodies a flexible trailing area, and a *quasi* rigid area, and a trailing extension housed between said surfaces and adapted to be projected and retracted in relation to the trailing edge of the aerofoil, said trailing extension having a translational connection with said trailing area.

18. An aerofoil having upper and lower lifting surfaces one of which embodies a flexible trailing area, and a *quasi* rigid area, a trailing extension housed between said surfaces and adapted to be projected and retracted in relation to the trailing edge of the aerofoil, said trailing extension having a translational connection with said trailing area, and means on the trailing extension for pinching together the trailing edges of said surfaces when said extension is fully retracted.

19. An aerofoil having upper and lower lifting surfaces one of which embodies a flexible trailing area, a trailing extension housed between said surfaces and adapted to be projected and retracted in relation to the trailing edge of the aerofoil, said trailing extension having a translational connection with said trailing area, and means for projecting and retracting said trailing extension embodying a floating spar, pull and thrust connections between said floating spar and trailing extension, and actuating means therefor.

In testimony whereof I affix my signature.

HARLAN DAVEY FOWLER.